US012567280B2

(12) United States Patent
Li et al.

(10) Patent No.: US 12,567,280 B2
(45) Date of Patent: Mar. 3, 2026

(54) VISUAL TRACKING SYSTEM FOR ACTIVE OBJECT

(71) Applicant: Alibaba Group Holding Limited, Grand Cayman (KY)

(72) Inventors: Yun Li, Troy, MI (US); Li Liu, Hangzhou (CN); Biao Tian, Hangzhou (CN); Zhang Liu, Hangzhou (CN); Ziteng Wang, Hangzhou (CN); Yueyue Na, Hangzhou (CN); Qiang Fu, Hangzhou (CN)

(73) Assignee: Alibaba Group Holding Limited (KY)

( * ) Notice: Subject to any disclaimer, the term of this patent is extended or adjusted under 35 U.S.C. 154(b) by 368 days.

(21) Appl. No.: 18/270,832

(22) PCT Filed: Jan. 4, 2021

(86) PCT No.: PCT/CN2021/070194
§ 371 (c)(1),
(2) Date: Jul. 3, 2023

(87) PCT Pub. No.: WO2022/141651
PCT Pub. Date: Jul. 7, 2022

(65) Prior Publication Data
US 2024/0062580 A1 Feb. 22, 2024

(51) Int. Cl.
*G06V 40/16* (2022.01)
*G01S 5/18* (2006.01)

(52) U.S. Cl.
CPC .............. *G06V 40/172* (2022.01); *G01S 5/18* (2013.01)

(58) Field of Classification Search
CPC .......... G06V 40/172; G01S 5/18; G10L 25/51
See application file for complete search history.

(56) References Cited

U.S. PATENT DOCUMENTS

| | | | |
|---|---|---|---|
| 2011/0184735 A1 | 7/2011 | Flaks et al. | |
| 2011/0285807 A1* | 11/2011 | Feng ...................... | G06V 40/70 704/E17.001 |
| 2014/0022332 A1* | 1/2014 | Wang .................... | H04M 3/567 348/14.07 |
| 2015/0146078 A1* | 5/2015 | Aarrestad ............ | H04N 23/635 348/345 |
| 2015/0341719 A1* | 11/2015 | Sun ...................... | G06V 40/161 381/92 |

(Continued)

FOREIGN PATENT DOCUMENTS

CN      110082723 A      8/2019

OTHER PUBLICATIONS

Search Report and Written Opinion for European Application No. 21912434.4, Dated Jul. 4, 2024, 7 pages.

(Continued)

*Primary Examiner* — Wassim Mahrouka
(74) *Attorney, Agent, or Firm* — Lee & Hayes, P.C.

(57) ABSTRACT

A visual tracking system helps to detect or locate an active object (such as an active sound source) in a live video or recorded video, and provides a way to help a user who views the live video or recorded video to focus on the active object, without easily being disturbed or distracted by other objects that are present with the active object. The visual tracking system may further track the active object, or detect a new active object when the live video or recorded video is played.

20 Claims, 12 Drawing Sheets

(56) References Cited

U.S. PATENT DOCUMENTS

2017/0366896 A1 * 12/2017 Adsumilli ............. H04N 23/60
2018/0349727 A1 12/2018 Moshfeghi
2020/0039081 A1  2/2020 Deyle et al.

OTHER PUBLICATIONS

International Search Report mailed Oct. 12, 2021, from PCT/CN2021/070194, 3 pages.
Written Opinion mailed Oct. 11, 2021, from PCT/CN2021/070194, 3 pages.
Office Action for European Application No. 21912434.4, dated Nov. 3, 2025, 6 pages.

* cited by examiner

User 408

User 404

User 402

600A

VISUAL TRACKING SYSTEM FOR ACTIVE OBJECT

CROSS-REFERENCE TO RELATED PATENT APPLICATIONS

This application claims priority to and is a continuation of PCT Patent Application No. PCT/CN2021/070194 filed on 4 Jan. 2021 and entitled "VISUAL TRACKING SYSTEM FOR ACTIVE OBJECT," which is incorporated herein by reference in its entirety.

BACKGROUND

The demand for video conferencing has been steadily increasing. For example, video conferencing has increasingly been adapted and used for virtual classrooms, web or remote meetings, etc. How to improve the user experience of video conferencing, and especially how to enable remote users to easily understand and communicate the content of a meeting more accurately and efficiently, so as to achieve an immersive meeting in meeting rooms are problems that the industry is currently starting to overcome. In addition to problems such as video transmission, audio and video call qualities, during a multi-person and multi-terminal video conference, a participating user may find it difficult to locate or focus on a main speaker without being influenced by the presence of other participants when the main speaker is situated in a group of other participants in the same meeting room. Furthermore, when a recorded video featuring multiple objects, for example, a speaker in the midst of other users, is played, it may be desirable to provide a focus on or indication of the speaker to avoid any distraction due to the other users.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
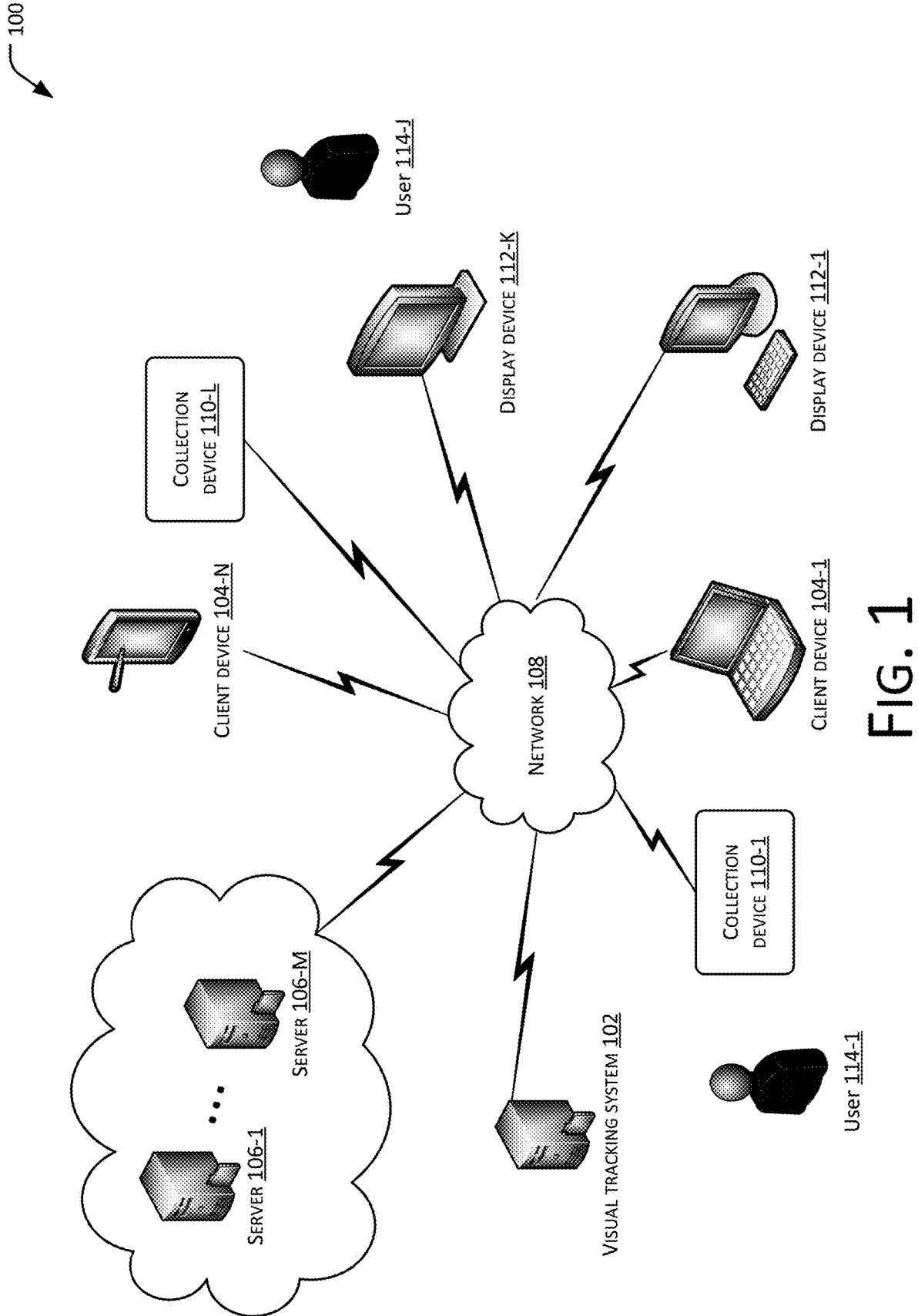
FIG. 1 illustrates an example environment in which a visual tracking system may be used.

As described above, existing technologies fail to locate an active speaker in the presence of a group of other persons on one end of a multi-person and multi-terminal video confer-ence, for example, and does not provide a way to help a participating user on another end of the video conference to focus on the active speaker without easily being disturbed or distracted by the other persons that are present with the active speaker. In some situations, a focus may easily be switched from the active speaker on one end of the video conference to another participating user on another end of the video conference even if the other participant simply makes some unrelated sound, such as a sneezing sound.

This disclosure describes an example visual tracking system. The visual tracking system helps to detect or locate an active object (such as an active speaker in a video conference, for example) in a live video or recorded video, and provides a way (such as providing an indicator, zooming in the active object, etc.) to help a user who views the live video or recorded video to focus on the active object, without easily being disturbed or distracted by other objects (e.g., objects that are present with the active object). The visual tracking system may further track the active object, or detect a new active object when the live video or recorded video is played.

In implementations, the visual tracking system may receive signal data associated with a video including audio data and image data. The video may be a live video (such as a live video conference, for example) that is lively or currently captured or collected by a collection device that includes one or more image or video sensors (such as a web camera, a digital camera, etc.), and a plurality of audio sensors (such as microphones, etc.). In implementations, the video may alternatively include a recorded video that has previously been captured or collected by a collection device. In implementations, the image data may include a plurality of video frames captured or collected by one or more image sensors of a collection device over a certain period of time, and the audio data may include corresponding audio signals captured or collected by a plurality of audio sensors of the collection device over the same period of time.

In implementations, the visual tracking system may determine one or more first position candidates for an active object in the video based on the audio data, and determine one or more second position candidates for the object based on the image data. In implementations, an active object may include, but is not limited to, a sound source that has actively produced a sound for at least a certain period of time. An example active object may include an active speaker who is talking for at least a certain time duration.

In implementations, after determining the one or more first position candidates and the one or more second position candidates, the visual tracking system may match the one or more first position candidates with the one or more second position candidates to obtain a matched position candidate for the object, and generate indication information of the object. In implementation, the visual tracking system may then send the indication information to a display device to enable the display device to provide an indication of the object in a subsequent presentation. In implementations, the subsequent presentation may correspond to one or more next video frames that are to be presented or displayed by the display device at subsequent or future time points after the last time point of the plurality of video frames included in the signal data.

As described above, the visual tracking system may detect and track an active object (such as an active speaker in a group of people that are located in a same place, for example) based on image data and audio data, and provide an indication of the active object to allow a user to quick locate the active object without being easily distracted by the presence of other persons. Furthermore, the use of low-cost image sensors (such as a web camera, a digital camera, etc.) and audio sensors (such as microphones, etc.) helps reducing the cost of the visual tracking system without sacrificing the quality of detecting, tracking, and viewing an active object. Moreover, the visual tracking system can collect the image data and the audio data of the active object through a collection device that may not need to be equipped with mechanically movable components to move sensors (such as mechanical arms to move a camera sideward or frontward to capture a scene, for example), and can thus further avoid or reduce the time latency due to the need of movement of any mechanical movable components.

Furthermore, functions described herein to be performed by the visual tracking system may be performed by multiple separate services or units. Moreover, although in the examples described herein, the visual tracking system may be implemented as a combination of software and hardware implemented in an individual entity or device, in other examples, the visual tracking system may be implemented and distributed as services provided in one or more computing devices over a network and/or in a cloud computing architecture.

The application describes multiple and varied embodiments and implementations. The following section describes an example framework that is suitable for practicing various implementations. Next, the application describes example systems, devices, and processes for implementing a visual tracking system.

Example Environment

FIG. 1 illustrates an example environment 100 usable to implement a visual tracking system. The environment 100 may include a visual tracking system 102. In implementations, the environment 100 may further include one or more client devices 104-1, . . . , 104-N (which are collectively called as client devices 104), and one or more servers 106-1, . . . , 106-M (which are collectively called as servers 106), where N and M are integers greater than or equal to one.

In this example, the visual tracking system 102 is described to be an individual entity or device. In other instances, the visual tracking system 102 may be located or included in at least one client device 104 and/or at least one server 106. For example, functions of the visual tracking system 102 may be performed by a client device 104 and/or a server 106. In implementations, the visual tracking system 102 may constitute a part of or be included in a data center or cloud computing infrastructure. In implementations, the visual tracking system 102, the one or more client devices 104, and the one or more servers 106 may communicate data with one another through a network 108.

In implementations, the visual tracking system 102 may be associated with one or more collection devices 110-1, . . . , 110-L (which are collectively called as collection devices 110) and one or more display devices 112-1, . . . , 112-K, where L and K are integers greater than or equal to one. In implementations, the one or more collection devices 110 and/or the one or more display devices 112 may be included in the visual tracking system 102. In implementations, the one or more collection devices 110 and/or the one or more display devices 112 may be peripheral and accessible to the visual tracking system 102. In implementations, a collection device 110 of the one or more collection devices 110 and/or a display device 112 of the one or more display devices 112 may directly be connected to the visual tracking system 102 through the network 108, for example, and communicate data with the visual tracking system 102 through the network 108. In implementations, a collection device 110 of the one or more collection devices 110 and/or a display device 112 of the one or more display devices 112 may be included in or peripheral to a corresponding client device 104 of the one or more client devices 104, and communicate data with the visual tracking system 102 through the corresponding client device 104. In implementations, a collection device 110 may include or be connected to or associated with a display device 112.

In implementations, each of the one or more client devices 104 and/or the one or more servers 106 may be implemented as any of a variety of computing devices, but not limited to, a desktop computer, a notebook or portable computer, a handheld device, a netbook, an Internet appliance, a tablet or slate computer, a mobile device (e.g., a mobile phone, a personal digital assistant, a smart phone, etc.), a server computer, etc., or a combination thereof.

In implementations, each of the one or more collection devices 110 may include one or more image or video sensors (which are collectively called as image sensors hereinafter), and a plurality of audio sensors. In implementations, an image sensor may include, but is not limited to, a web camera, a digital camera, etc. In implementations, an audio sensor may include, for example, a microphone, etc. In implementations, a geometric configuration or arrangement of one or more image sensors and a plurality of audio sensors in a collection device 110 may be preset. By way of example and not limitation, a collection device 110 may include a plurality of audio sensors (such as two microphones, for example) that may be arranged horizontally, and are placed at a level that may be the same as, lower than, or higher than one or more image sensors (such as a web camera or digital camera, for example). Apparently, other different geometric configurations or arrangements of image sensors and audio sensors and respective numbers of the image sensors and the audio sensors in a collection device 110 can be made according to application requirements, etc.

In implementations, each of the one or more display devices 112 may be implemented as any of a variety of devices having display capabilities, but not limited to, a monitor, a video projector, or a client device having display capabilities (such as a notebook or portable computer, a handheld device, a netbook, an Internet appliance, a tablet or slate computer, a mobile device, etc.), etc. In implementations, The network 108 may be a wireless or a wired network, or a combination thereof. The network 108 may be a collection of individual networks interconnected with each other and functioning as a single large network (e.g., the Internet or an intranet). Examples of such individual networks include, but are not limited to, telephone networks, cable networks, Local Area Networks (LANs), Wide Area Networks (WANs), and Metropolitan Area Networks (MANS). Further, the individual networks may be wireless or wired networks, or a combination thereof. Wired networks may include an electrical carrier connection (such a communication cable, etc.) and/or an optical carrier or connection (such as an optical fiber connection, etc.). Wireless networks may include, for example, a WiFi network, other radio frequency networks (e.g., Bluetooth®, Zigbee, etc.), etc.

In implementations, the environment 100 may further include one or more users 114-1, . . . , 114-J (which are collectively called as the users 114), where J is an integer greater than or equal to one. In implementations, the visual tracking system 102 may be employed to detect and track an active sound source, such as an active speaker (such as the user 114-1), in a scene captured by a collection device 110

(e.g. the collection device 110-1), and provide information of the active sound source to a display device 112 (such as the display device 112-K) to enable the display device 112 to indicate (e.g., highlight, etc.) the active sound source (i.e., the user 114-1 in this example) in a presentation (such as a video presentation, etc.) to be viewed by other users (such as the user 114-J in this example).

Example Visual Tracking System

Figure 2:
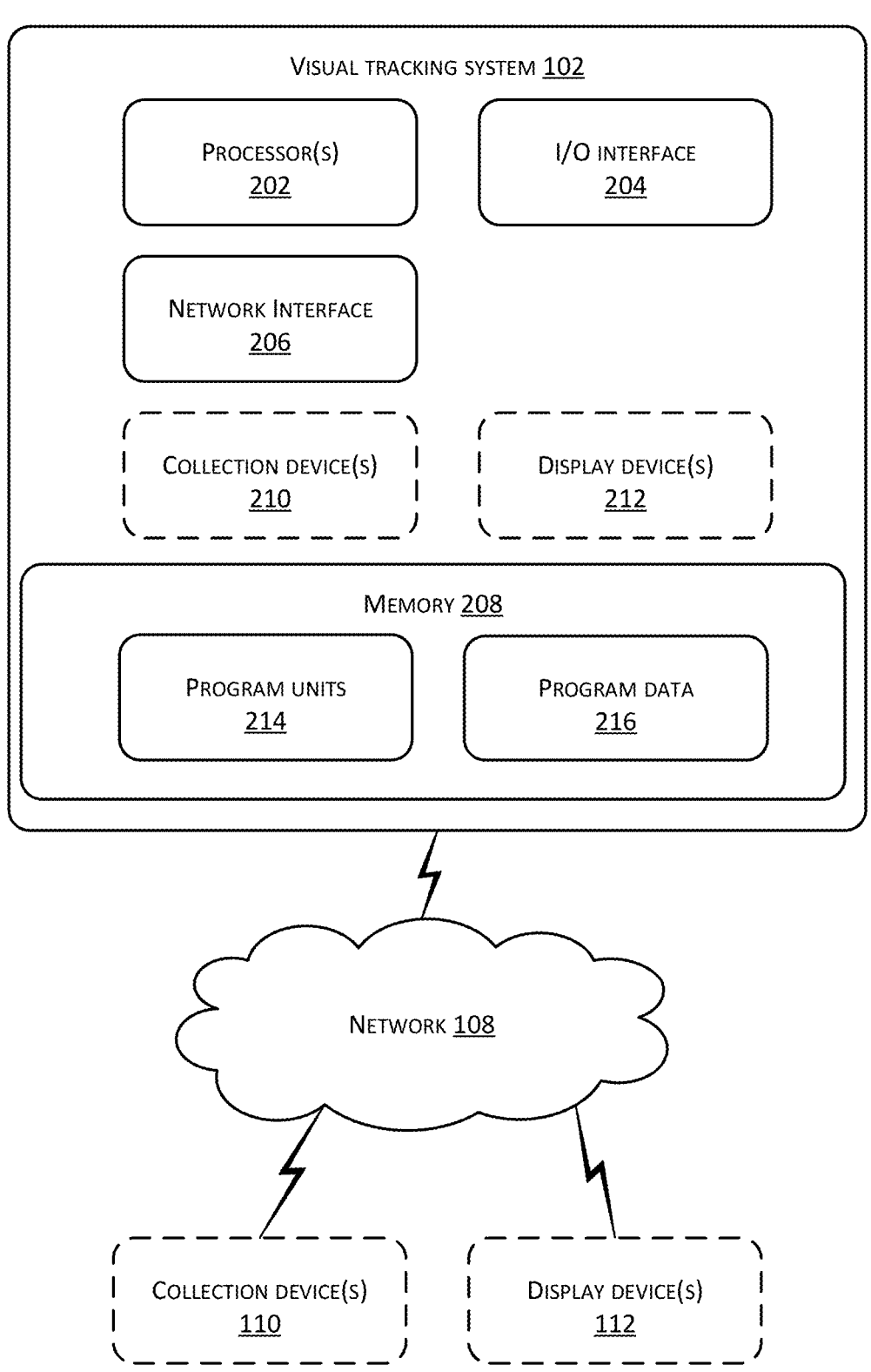
FIG. 2 illustrates the example visual tracking system in more detail.

FIG. 2 illustrates the visual tracking system 102 in more detail. In implementations, the visual tracking system 102 may include, but is not limited to, one or more processors 202, an input/output (I/O) interface 204, and/or a network interface 206, and memory 208. In implementations, some of the functions of the visual tracking system 102 may be implemented using hardware, for example, an ASIC (i.e., Application-Specific Integrated Circuit), a FPGA (i.e., Field-Programmable Gate Array), and/or other hardware.

In implementations, the visual tracking system 102 may include one or more collection devices 210 (such as the collection device 110). Additionally or alternatively, the visual tracking system 102 may be associated with one or more collection devices (such as the one or more collection devices 110) that are peripheral and accessible to the visual tracking system 102. Additionally or alternatively, the visual tracking system 102 may be associated with one or more collection devices (such as a collection device 110 that may exist as an individual entity and/or a collection device 110 that may be included in a client device 104, etc.) that are connected to the visual tracking system 102 through a network (such as the network 108). In implementations, some of the functions of the visual tracking system 102 may be implemented using hardware, for example, an ASIC (i.e., Application-Specific Integrated Circuit), a FPGA (i.e., Field-Programmable Gate Array), and/or other hardware.

In implementations, the visual tracking system 102 may include one or more display devices 212 (such as the display device 112). Additionally or alternatively, the visual tracking system 102 may be associated with one or more display devices (such as the one or more display devices 112) that are peripheral and accessible to the visual tracking system 102. Additionally or alternatively, the visual tracking system 102 may be associated with one or more display devices (such as a display device 112 that may exist as an individual entity and/or a display device 112 that may be included in a client device 104, etc.) that are connected to the visual tracking system 102 through a network (such as the network 108).

In implementations, the processors 202 may be configured to execute instructions that are stored in the memory 208, and/or received from the I/O interface 204, the network interface 206, the collection device 210, and/or the display device 212. In implementations, the processors 202 may be implemented as one or more hardware processors including, for example, a microprocessor, an application-specific instruction-set processor, a physics processing unit (PPU), a central processing unit (CPU), a graphics processing unit, a digital signal processor, a tensor processing unit, etc. Additionally or alternatively, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc.

The memory 208 may include computer readable media in a form of volatile memory, such as Random Access Memory (RAM) and/or non-volatile memory, such as read only memory (ROM) or flash RAM. The memory 208 is an example of computer readable media.

The computer readable media may include a volatile or non-volatile type, a removable or non-removable media, which may achieve storage of information using any method or technology. The information may include a computer readable instruction, a data structure, a program module or other data. Examples of computer readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include any transitory media, such as modulated data signals and carrier waves.

Although in this example, only hardware components are described in the visual tracking system 102, in other instances, the visual tracking system 102 may further include other hardware components and/or other software components such as program units 214 to execute instructions stored in the memory 208 for performing various operations, and program data 216 that stores application data and data of tasks processed by the visual tracking system 102. For example, the program data 216 may store or include calibration or prediction models for collection devices (such as the collection devices 110, the collection devices 210, etc.).

Example Methods

Figure 3:
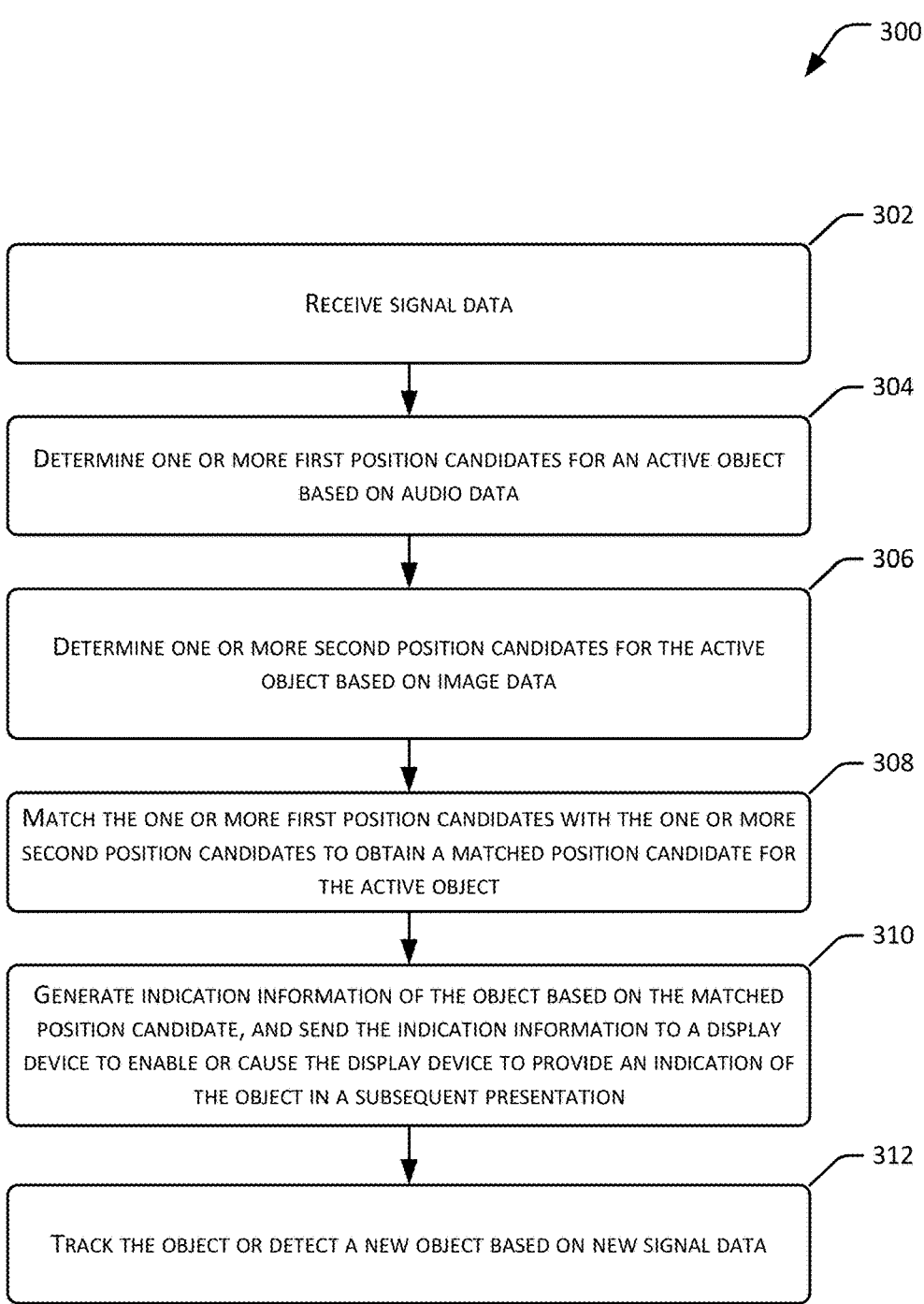
FIG. 3 illustrates an example visual tracking method.

FIG. 3 illustrates a schematic diagram depicting an example visual tracking method. The method of FIG. 3 may, but need not, be implemented in the environment of FIG. 1 and using the system of FIG. 2. For ease of explanation, method 300 is described with reference to FIGS. 1 and 2. However, the method 300 may alternatively be implemented in other environments and/or using other systems.

The method 300 is described in the general context of computer-executable instructions. Generally, computer-executable instructions can include routines, programs, objects, components, data structures, procedures, modules, functions, and the like that perform particular functions or implement particular abstract data types. Furthermore, each of the example methods are illustrated as a collection of blocks in a logical flow graph representing a sequence of operations that can be implemented in hardware, software, firmware, or a combination thereof. The order in which the method is described is not intended to be construed as a limitation, and any number of the described method blocks can be combined in any order to implement the method, or alternate methods. Additionally, individual blocks may be omitted from the method without departing from the spirit and scope of the subject matter described herein. In the context of software, the blocks represent computer instructions that, when executed by one or more processors, perform the recited operations. In the context of hardware, some or all of the blocks may represent application specific integrated circuits (ASICs) or other physical components that perform the recited operations.

Referring back to FIG. 3, at block 302, the visual tracking system 102 may receive signal data.

In implementations, the visual tracking system 102 may receive a data stream of signal data. The signal data which may include, but is not limited to, image data and audio data. By way of example and not limitation, the signal data may include signal data (such as a live video stream that includes image data and audio data) that is currently or lively collected or captured by a collection device 110. In implementations, the collection device 110 may collect or capture data of a scene that includes one or more objects using one or more image sensors (or video sensors) and a plurality of audio sensors to generate signal data (e.g., image data and audio data, etc.). In this case, the audio data may include respective audio signals that are collected or captured by the plurality of audio sensors of the collection device 110, while the image data may include a plurality of video frames that are collected or captured by the one or more image sensors of the collection device 110.

In implementations, the signal data may include signal data that is extracted from at least a video segment of a recorded video including a scene having one or more objects and include image data and audio data. In implementations, the audio data may include respective audio signals that are stored in audio tracks of the video segment of the recorded video, and the image data may include video frames of the video segment of the recorded video. In implementations, the recorded video may be previously obtained or captured by a collection device (such as the collection device 110) using one or more image sensors (or video sensors) and a plurality of audio sensors thereof.

In implementations, as described above, the signal data may include data (such as image data and audio data) of a scene having one or more objects. In implementations, the one or more objects may include an active object (i.e., an object to be detected), which may include, but is not limited to, an active sound source, etc. In implementations, an active object or an active sound source may include a sound source that actively makes a sound for a consecutive period of time or time duration that is greater than or equal to a predefined time threshold. This helps to avoid detecting any object that does not actively make sound, and differentiates an active sound source (such as a human person who currently or actively gives a speech, for example) from a sound source (such as a human person who suddenly sneezes, for example) that makes a spontaneous or short sound. In implementations, the predefined time threshold may be configured or defined by the visual tracking system 102 or a user of the visual tracking system 102. Examples of the predefined time threshold may include 1 second, 2 seconds, 5 seconds, 10 seconds, 20 seconds, etc.

Figure 4:
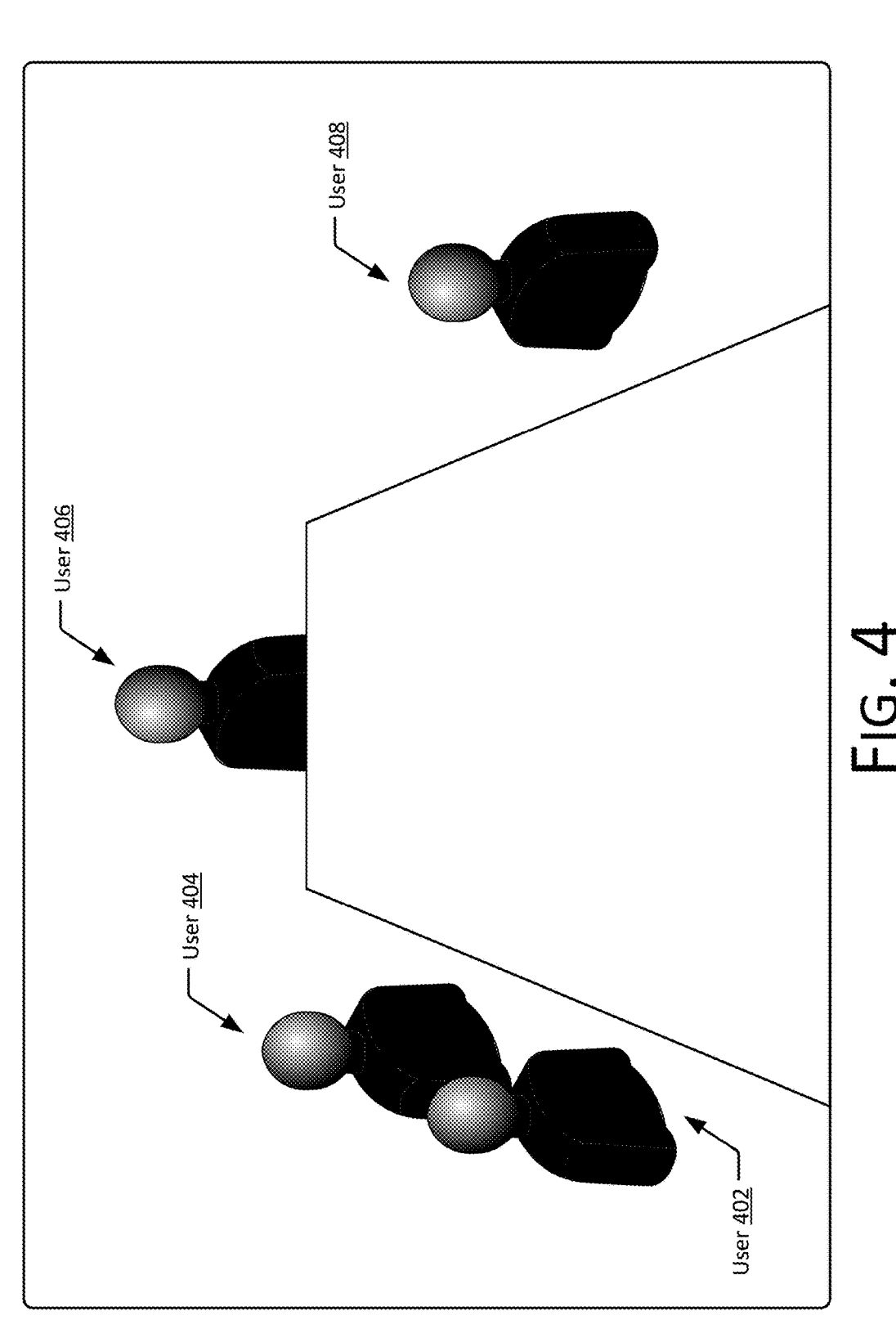
FIG. 4 illustrates an example scenario showing a video conference including a plurality of users on one end of the video conference.

In implementations, due to the presence of objects other than the active object, the signal data may include additional data of these other objects (which may or may not be an active sound source, for example) in addition to data (such as audio data and image data) of the active object. FIG. 4 illustrates an example scenario 400 depicting one end of video conference that includes a plurality of users 402, 404, 406, and 408. In this example, the user 408 is an active speaker who is currently or actively speaking in the presence of the other users 404, 406, and 408 in the same end (i.e., the same room) of the video conference, and a collection device 110 captures or streams this end of the video conference using one or more image sensors and a plurality of audio sensors of the collection device 110.

In implementations, for the sake of simplicity, in this example, the number of active object is described to be one.

In some other instances, the active object may include multiple active objects, such as multiple active sound sources that are found to be making sound (such as multiple active speakers who are currently or actively speaking in a same scene for a certain time duration that is greater than a predefined time threshold, for example) from the signal data. In the latter case, the visual tracking system 102 may perform the described method 300 to detect each active object, and operate on data of each active object as described in the method 300 hereinafter.

At block 304, the visual tracking system 102 may determine one or more first position candidates for an active object based on audio data.

In implementations, after receiving the signal data (that is received from a collection device 110 or extracted from a recorded video), the visual tracking system 102 may obtain or extract audio data of an adaptive time length from the signal data for determining one or more first position candidates for an active object. In implementations, the visual tracking system 102 may employ the audio data of the adaptive time length to predict or estimate one or more potential candidates for a position or location of the active object at a next or future time point that is after a time point corresponding to an end of the obtained or extracted audio data.

In implementations, the adaptive time length may be configured or adapted by the visual tracking system 102 based on a number of factors, which may include, but are not limited to, a collection rate of the collection device 110 (such as a frame rate of the image sensor, a sampling rate of the audio sensor, etc.), a processing capability of the visual tracking system 102, a number of video frames that are needed for determining that an active object is detected or located, etc.

In implementations, the visual tracking system 102 may apply a predetermined sound localization method on audio data to obtain or determine one or more potential candidates for a position of the active object (e.g., an active sound source such as the active speaker 408 in the example of FIG. 4). In implementations, the visual tracking system 102 may sample the audio data at a plurality of time points within the adaptive time length, and apply a predetermined sound localization method on a respective part of the audio data at each time point of the plurality of time points to obtain or determine one or more first position candidates for the active object. In implementations, the plurality of time points may be the number of video frames in the image data of the signal data in the same adaptive time length of the audio data. Examples of the sound localization method may include, but are not limited to, a GCC-PHAT (General Cross-Correlation with Phase Transform) method, a SPR-PHAT (Steered-Response Power with Phase Transform) method, a MUSIC (Multiple Signal Classification) method, etc. In implementations, the one or more first position candidates for the active object may be represented in terms of relative distances and azimuth angles with respect to a particular physical point (such as a center position of the plurality of audio sensors, a center of the one or more image sensors, etc.) of the collection device 110 that is used for collecting or capturing the signal data.

At block 306, the visual tracking system 102 may determine one or more second position candidates for the active object based on image data.

In implementations, after obtaining the signal data (that is received from the collection device 110 or extracted from the recorded video), the visual tracking system 102 may perform obtain or extract image data of the adaptive time length that is the same as that of the audio data obtained or extracted at block 304 from the signal data for determining one or more second position candidates for the active object. In implementations, the visual tracking system 102 may employ the image data of the adaptive time length to predict or estimate additional one or more potential candidates for the position or location of the active object at the next or future time point that is after the time point corresponding to an end of the obtained or extracted image data (i.e., the time point corresponding to the end of the audio data obtained or extracted at block 304).

In implementations, the visual tracking system 102 may apply a predetermined object recognition method to identify one or more potential object candidates for the active object. For example, the image data may include a plurality of video frames that are collected or captured by the one or more image sensors of the collection device 110 in the same adaptive time length of the audio data as described above at block 304. The visual tracking system 102 may apply a predetermined object recognition method to identify one or more potential object candidates at each time point of the image data (i.e., for each video frame of the plurality of video frames). In implementations, depending on a type of the active object, different object recognition methods may be used. For example, if the active object is a human person, a conventional human face recognition method (such as a Viola-Jones object detection method, etc.) or a conventional object recognition that is specialized for identifying or recognizing a human face or object may be used.

In implementations, after identifying the one or more object potential candidates from the image data (e.g., from the plurality of video frames of the image data), the visual tracking system 102 may calculate corresponding positions of the one or more potential object candidates. In other words, the visual tracking system 102 may obtain or determine one or more second position candidates for the active object based on the image data.

In implementations, the visual tracking system 102 may calculate or determine corresponding positions of the one or more potential object candidates to according to an image coordinate system (i.e., an image coordinate system of video frames generated by the collection device 110). By way of example and not limitation, after identifying the one or more potential object candidates from a certain video frame of the image data, the visual tracking system 102 may calculate or determine relative positions of the one or more potential object candidates with respect to an origin (such as a bottom-left corner or a top-left corner of a video frame) of an image coordinate system of that video frame. For example, the visual tracking system 102 may calculate or determine relative positions of respective centers of the one or more potential object candidates with respect to the origin of the image coordinate system of that video frame.

In implementations, the visual tracking system 102 may convert the corresponding positions of the one or more potential object candidates in the image coordinate system (e.g., the relative positions of respective centers of the one or more potential object candidates in the image coordinate system as described above) into one or more second position candidates for the active object. By way of example and not limitation, the visual tracking system 102 may obtain or retrieve a calibration or prediction model for the collection device 110 by which the signal data is collected or captured (i.e., the collection device 110 by which the signal data of the live video stream or the recorded video is collected or captured as described in the above example). In implementations, the visual tracking system 102 may obtain or retrieve the calibration or prediction model for the collection device 110 from the program data 216.

In implementations, the calibration or prediction model for the collection device 110 may be determined or calibrated in advance by using a plurality of known pairs of positions of objects in an image coordinate system of the collection device 110 (such as relative positions of respective centers of the objects in the image coordinate system of the collection device 110 as described above) and corresponding position coordinates in a real-world coordinate system (such as the same real-world coordinate system used by the corresponding predetermined sound localization method for obtaining or determining the one or more first position candidates at block 306). In implementations, based on the known pairs of these positions of objects and corresponding position coordinates in the real-world coordinate system, a least squares regression method or a linear regression method may be used to obtain a calibration or prediction function, which can be used as the calibration or prediction model for the collection device 110.

At block 308, the visual tracking system 102 may match the one or more first position candidates with the one or more second position candidates to obtain a matched position candidate for the active object.

In implementations, after obtaining or determining the one or more first position candidates and the one or more second position candidates (for example, at each time point of the plurality of time points over the adaptive time length), the visual tracking system 102 may match the one or more first position candidates with the one or more second position candidates to obtain one or more matched position candidates for potential object candidates (for example, at each time point in the adaptive time length).

In implementations, the visual tracking system 102 may separately or individually enclose the one or more potential object candidates with corresponding one or more predefined bounding boxes or predefined shapes (such as a rectangle, a circle, an ellipse, etc.) of a predetermined size in that video frame. The visual tracking system 102 may then calculate or determine relative positions of the corresponding one or more predefined shapes that separately or individually enclose the one or more potential object candidates with respect to an origin (such as a bottom-left corner or a top-left corner of a video frame) of an image coordinate system of that video frame. For example, the visual tracking system 102 may calculate or determine relative positions of respective centers of the corresponding one or more predefined shapes with respect to the origin of the image coordinate system of that video frame. In implementations, the predetermined size of the predefined shape may be determined according to one or more factors, which may include, but are not limited to, a size of the video frame, an average size or a maximum size of the one or more potential object candidates identified for the active object in the video frame, etc.

In implementations, at a time point t of the signal data (i.e., at a time point t of the plurality of time points of the audio data and the image data), if a first position candidate determined from the audio data and a second position candidate determined from the image data is separated by a distance less than or equal to a distance or range threshold that is predetermined by the visual tracking system 102, the visual tracking system 102 may consider that a match is found, and add one count to a potential object candidate corresponding to the second position candidate for the time point t. The visual tracking system 102 may employ a confidence buffer to accumulate a respective number of counts for each potential object candidate that is detected from time points 0 up to t.

In implementations, this number of counts for each potential object candidate may be normalized (for example, over a total number of counts for all potential object candidates that are detected), and treated as a confidence level for the respective potential object candidate. In implementations, when a confidence level for a certain potential object candidate is greater than or equal to a predefined confidence level threshold at a certain time point t of the signal data (i.e., at a time point t of the plurality of time points of the audio data and the image data), the visual tracking system 102 may consider that an active object is detected at the time point t, and this potential object candidate is the active object. In this case, the visual tracking system 102 may set and output a corresponding first position candidate or second position candidate as a matched position candidate for the active object.

In implementations, more complex or sophisticated active object detection methods may be employed. By way of example and not limitation, the visual tracking system 102 may perform an entropy estimation to measure a total uncertainty E(t) at a video frame at a time point t by fusing individual normalized confidence levels of potential object candidates that are detected up to the time point t as follows:

$$E(t) = -\sum\nolimits_{i=0}^{N_t-1} P_i(t)\log(P_i(t)),$$

where $P_i(t)$ is a confidence level of a potential object candidate i at a time point t, and $N_t$ is the number of potential object candidate(s) detected at the time point t.

In implementations, a hypothesis of detecting an active object may be performed as follows:

$$y(t) = \begin{cases} 1 & \text{if } E(t) < \delta \\ 0 & \text{else} \end{cases},$$

where $\delta$ is a predefined uncertainty threshold that is used for indicating how uncertain an active object is present. When y(t)=1, an active object is detected. Otherwise, no active object is detected when y(t)=0.

In implementations, after an active object is detected (i.e., y(t)=1) at a certain time point t, the visual tracking system 102 may select a potential object candidate that has a highest confidence level at the time point t, and set a corresponding first or second position candidate as a matched position candidate for the active object.

At block 310, the visual tracking system 102 may generate indication information of the object based on the matched position candidate, and send the indication information to a display device to enable or cause the display device to provide an indication of the object in a subsequent presentation.

In implementations, after obtaining or determining the matched position candidate for the active object at a certain time point (such as a time point t in this example), the visual tracking system 102 may generate or determine indication information of the object based on the matched position candidate, and send the indication information to a display device (such as the display device 112), to enable or cause the display device 112 to provide an indication of the active object in a subsequent presentation. In implementations, the subsequent presentation may include one or more next video frames that are to be presented or displayed by the display device 112 at subsequent or future time points after the time point (i.e., the time point t in this example) that the active object is detected or found by the visual tracking system 102. In implementations, the subsequent presentation may include one or more next video frames of a live video stream or a recorded video that are to be presented or played by the display device 112 at the subsequent or future time points, etc.

In implementations, the visual tracking system 102 may employ a variety of different display modes to enable or cause the display device 112 to provide an indication of the active object in a subsequent presentation. In implementations, the variety of different display modes may include, but are not limited to, a zoom-in image mode, a PIP (picture-in-picture)/FIF (frame-in-frame) image mode, and a shape indication mode. In some instances, the variety of different display modes may further include a PBP (picture-by-picture) image mode. Since the PBP image mode is similar to the PIP image mode, with differences being that a highlighted image is placed inside an original image in the PIP image mode whereas the highlighted image and a reduced version of the original image are placed side by side in the PBP image mode, the PIP image mode is described hereinafter as an illustrative example. Operations of the PBP image mode can be derived based on operations of the PIP image mode described hereinafter.

In implementations, in a zoom-in image mode, the visual tracking system 102 may change an image resolution of the active object, and generate a zoom-in or enlarged image of the active object based on the matched position candidate, and set the zoom-in or enlarged image of the active object as the indication information to be sent to the display device 112. By way of example and not limitation, the visual tracking system 102 may zoom in or enlarge a portion of a next video frame (e.g., a next video frame of a live video stream or a recorded video that is to be presented or played by the display device 112, etc.) that includes the active object at the matched position candidate to a full size of the next video frame, and set pixel data of this zoom-in or enlarged image of the active object as the indication information to be sent to the display device 112. In this case, the visual tracking system 102 may send the indication information (i.e., the pixel data of the zoom-in or enlarged image of the active object) to the display device 112 to enable or cause the display device 112 to display or render the zoom-in image of the active object in the subsequent presentation (e.g., the next video frame of the live video stream or the recorded video that is presented or played by the display device 112, etc.).

In implementations, in a PIP/FIF image mode, the visual tracking system 102 may generate or select a portion of a next video frame that includes the active object at the matched position candidate, and set pixel data of this portion of the next video frame that includes the active object as the indication information to be sent to the display device 112. In this case, the visual tracking system 102 may send the indication information (i.e., the pixel data of the portion of the next video frame that includes the active object) and original pixel data of the next video frame to the display device 112 to enable or cause the display device 112 to display or render this portion of the next video frame that includes the active object in the subsequent presentation (e.g., on top of the next video frame of the live video stream or the recorded video that is presented or played by the display device 112, etc.). For example, the visual tracking system 102 may enable or cause the display device 112 to display or render this portion of the next video frame that includes the active object as a PIP/FIF image to be placed or superimposed at a predetermined position on top of the next video frame (i.e., the subsequent presentation). In implementation, the predetermined position may include, but is not limited to, a center portion of the next video frame, a lower center portion of the next video frame, an upper center portion of next video frame, etc.

Alternatively, in implementations, in a PIP/FIF image mode, the visual tracking system 102 may first replace pixel data of a predetermined area of the next video frame at a predetermined position (such as a center portion of the next video frame, a lower center portion of the next video frame, an upper center portion of next video frame, etc.) by the pixel data of the portion of the next video frame that includes the active object to form a new video frame, and set pixel data of this new video frame as the indication information to be sent to the display device 112. In this case, the visual tracking system 102 may send the indication information (i.e., pixel data of the new video frame) to the display device 112 to enable or cause the display device 112 to display or render this new video frame as the subsequent presentation (e.g., the next video frame of the live video stream or the recorded video that is presented or played by the display device 112, etc.).

In implementations, in a shape indication mode, the visual tracking system 102 may determine a predefined shape of a predetermined size that encloses at least a portion of the active object at the matched position candidate in a next video frame, and set information (such as pixel data) of the predefined shape that encloses the active object as the indication information. In this case, the visual tracking system 102 may then send the indication information to the display device 112 to enable or cause the display device 112 to draw the predefined shape of the predetermined size to enclose at least a portion of the active object that is displayed in the subsequent presentation (e.g., the next video frame of the live video stream or the recorded video that is presented or played by the display device 112, etc.).

Figure 5A:
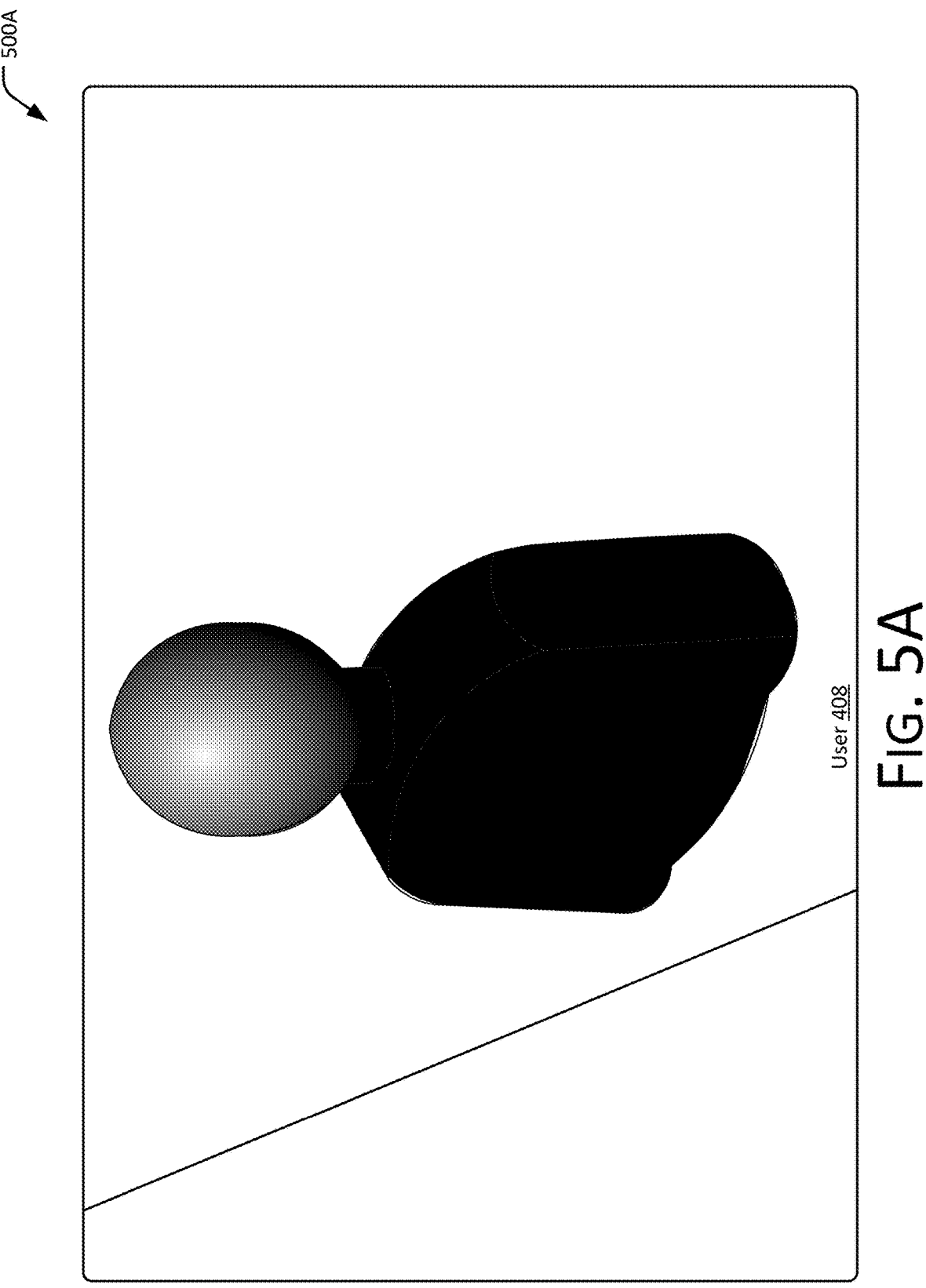
FIGS. 5A-5C illustrate example display results obtained for an active speaker of FIG. 4 according to different display modes.
Figure 5B:
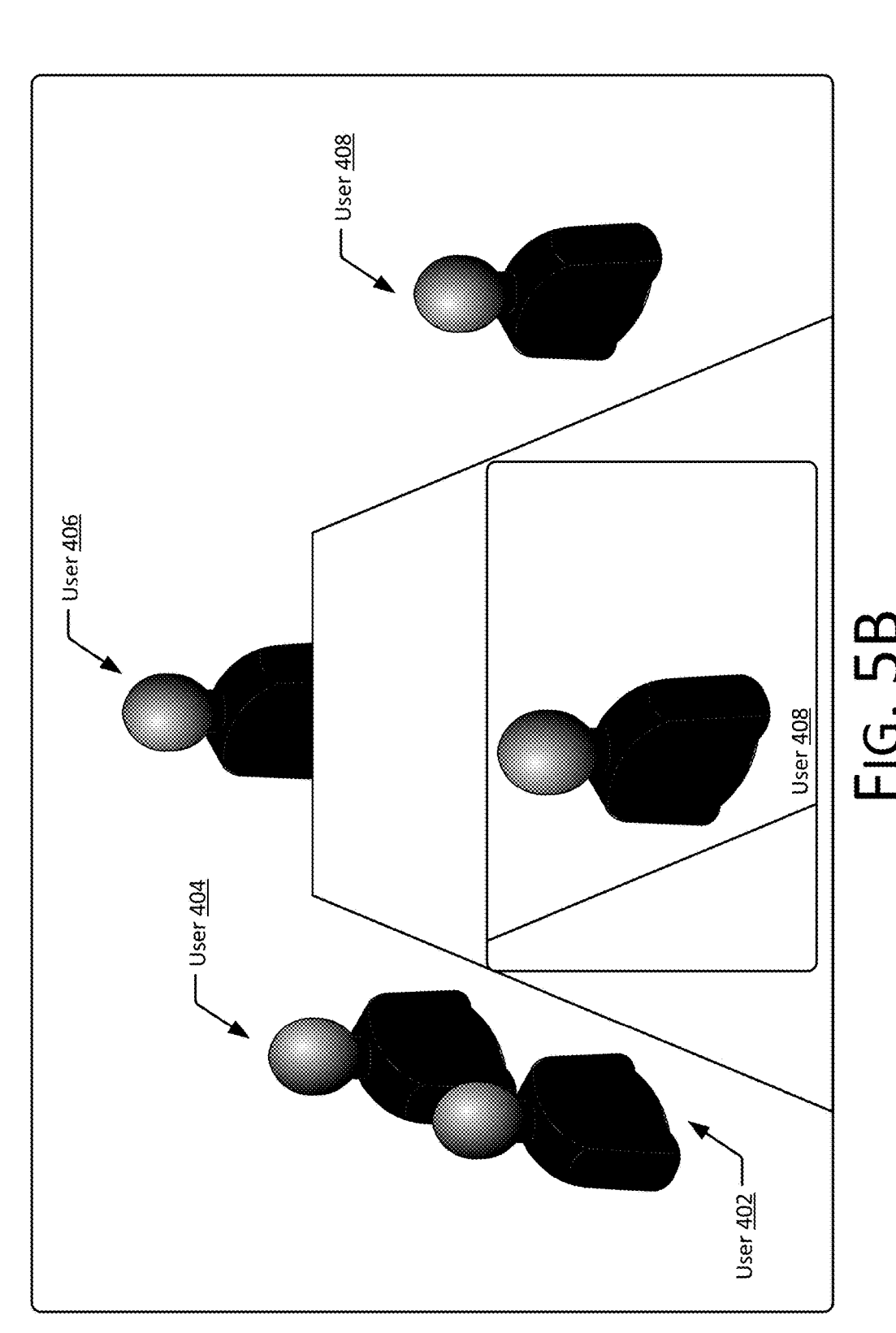
Figure 5C:
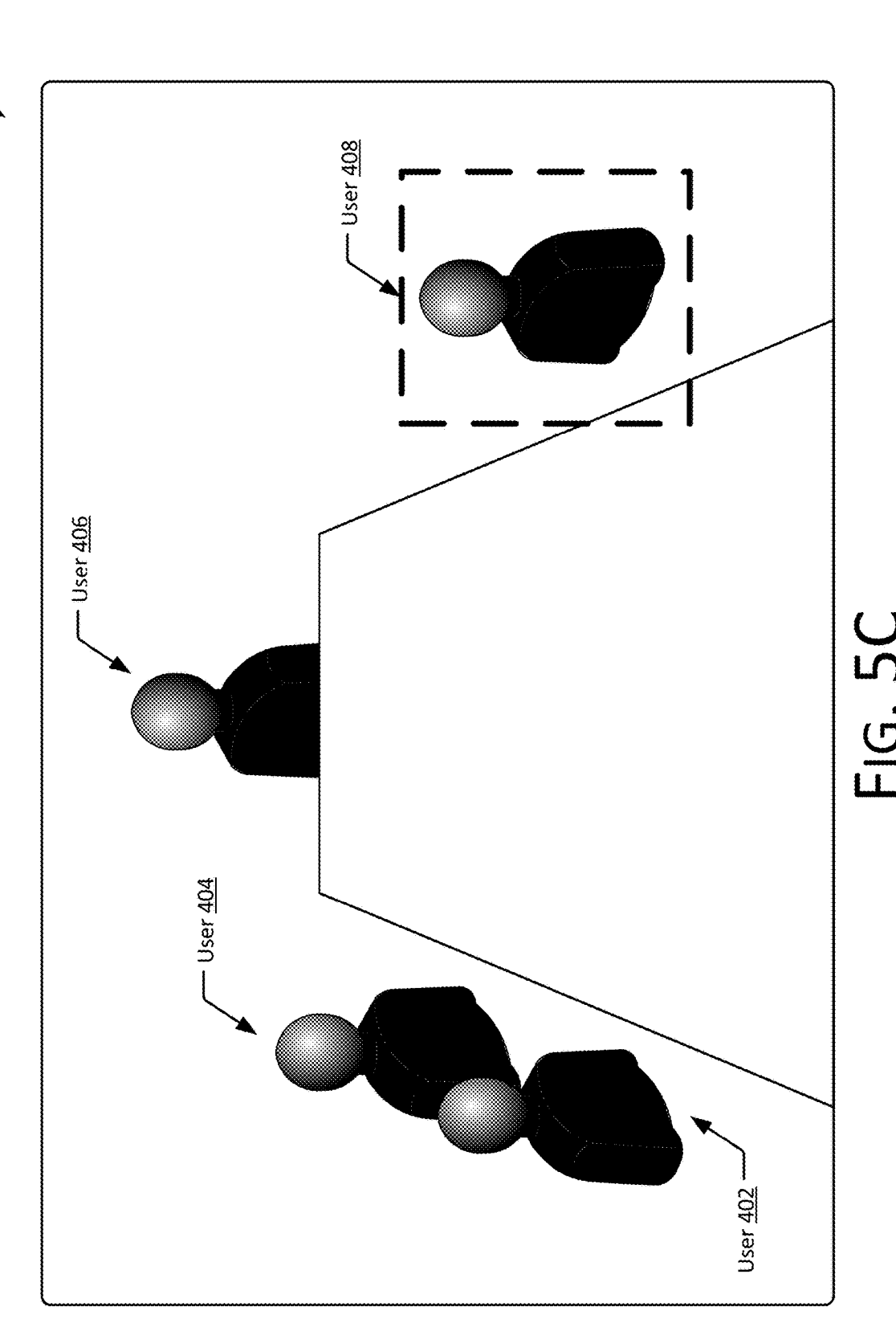

Alternatively, in implementations, in a shape indication mode, the visual tracking system 102 may generate or draw a predefined shape of a predetermined size that encloses at least a portion of the active object at the matched position candidate onto a next video frame to form a new video frame, and set information (such as pixel data) of this new video frame that includes the predefined shape enclosing the active object as the indication information. In this case, the visual tracking system 102 may then send the indication information to the display device 112 to enable or cause the display device 112 to display or render the new video frame (i.e., a combination of original pixel data of the next video frame and pixel data of the predefined shape of the predetermined size that encloses at least a portion of the active object) as the subsequent presentation. FIGS. 5A-5C illustrate example display results 500A, 500B, and 500C that are obtained for an active speaker (e.g., the user 408 of FIG. 4) and presented in a subsequent presentation according to a zoom-in image mode, a PIP/FIF image mode, and a shape indication mode respectively.

In implementations, the visual tracking system 102 may receive an instruction from a user of the display device 112 to change a first or current display mode (for example, a zoom-in image mode, a PIP/FIF image mode, or a shape indication mode, etc.) to a another or new display mode. In implementations, the visual tracking system 102 may receive the instruction from the user through the display device 112 or a client device (such as the client device 104) that is associated or peripheral with the display device 112 and that is capable of communicating data (such as instructions, for example) with the visual tracking system 102 locally or remotely (e.g., through the network 108). In response to receiving the instruction from the user, the visual tracking system 102 may then update the current display mode to the new display mode, and perform operations on new signal data (i.e., new signal data that is continuously received from a live video stream or extracted from a recorded video as described as an example at block 302) to obtain or determine a newly matched position candidate of an active object (which may or may not be the same as the active object that has been detected) as described at blocks 302-308. The visual tracking system 102 may then generate indication information of the active object based on the newly matched position candidate according to the new display mode, and send the indication information to the display device 112 to enable the display device 112 to provide the indication of the active object in a subsequent presentation (i.e., one or more video frames that are to be presented or displayed by the display device 12 after corresponding video frames in the new signal data).

In implementations, the visual tracking system 102 may receive an instruction from a user of the display device 112 to move, resize, or adjust the indication of the active object on a screen of the display device 112. By way of example and not limitation, the user may send an instruction to move a PIP/FIF image from a first position to a second position via the display device 112 or a client device 104 associated with the display device 112. In response to receiving such moving instruction, instead of replacing pixel data of a predetermined area centered at the first position of a subsequent video frame by pixel data of a PIP/FIF image of an active object, the visual tracking system 102 may replacing pixel data of the predetermined area centered at the second position of the subsequent video frame by the pixel data of the PIP/FIF image of the active object to form a modified video frame, and send pixel data of this modified video frame to the display device 112 for display, for example, as a subsequent presentation.

In implementations, as the visual tracking system 102 continues to receive new signal data (e.g., incoming or new image data and audio data of the live video stream collected by the collection device 110, or image data and audio data of a next video segment extracted or obtained from the recorded video), the visual tracking system 102 may automatically or adaptively adjust indication information of an active object that is detected based on a newly matched position candidate with or without an input from the user of the display device 112, and send the adjusted indication information to the display device 112 to enable or cause the display device 112 to resize or adjust an indication of the active object in subsequent presentations (e.g., subsequent video frames of the live video stream or the recorded video that are to be presented or displayed by the display device 112). For example, a shape that is used to enclose and indicate an active object at a certain position in a video frame displayed by the display device 112 at a certain time point may be set to be relatively large initially. As more signal data is received, the visual tracking system 102 may gradually adjust (e.g., increase or decrease) the size of the shape that encloses the active object at subsequent time points due to a change (e.g., a decrease or increase) in a confidence level for the active object at that particular position.

At block 312, the visual tracking system 102 may track the object or detect a new object based on new signal data.

In implementations, the visual tracking system 102 may continue receive new signal data (such as new audio data and new video data from the live video stream or the recorded video, for example). In implementations, the visual tracking system 102 may then continue to track or auto-frame the object that has been detected or detect a new object (such as a new active sound source) based on the new signal data. In implementations, the visual tracking system 102 may continue to perform the above described operations to determine or obtain new first position candidates and new second position candidates respectively based on audio data and image data of the signal data, compare the new first position candidates with the new second position candidates to obtain a newly matched position candidate, and obtain or detect an active object associated with the newly matched position candidate. In implementations, the active object associated with the newly matched position candidate may be the active object that has previously been detected or a new active object (such as an active sound source that newly makes sound, for example, an active speaker that is newly speaking, etc.) that is different from the active object that has previously been detected. In either case, the visual tracking system 102 may generate indication information of the active object based on the newly matched position candidate, and send the indication information to the display device 112 as described above to enable the display device to provide an indication of the object associated with the newly matched position candidate in a newly subsequent presentation (i.e., another next video frame of the live video stream or the recorded video that is presented or played by the display device 112, etc.).

Although in the above description of the example method 300, only one active object is described for the sake of simplicity, in some instances, multiple active objects (such as multiple active sound sources, for example) may be present. In an event that multiple active objects are present and found, the visual tracking system 102 may obtain multiple matched position candidates for the multiple active objects (i.e., one matched position candidate for each active object), when the first position candidates obtained from the audio data at block 304 are matched with the second position candidates obtained from the image data at block 306. Furthermore, each of these multiple active objects may be represented by a corresponding potential object candidate obtained at block 306, which is further enclosed by a predefined shape (such as a rectangle, for example) of a predetermined size at block 306.

In implementations, the visual tracking system 102 may separately or cooperatively determine or generate indication information of the multiple active objects based on the multiple matched position candidates. By way of example and not limitation, the visual tracking system 102 may separately or cooperatively determine or generate indication information of the multiple active objects based on the multiple matched position candidates, depending on a comparison of a measure of separation between the multiple active objects with respect to a predetermined separation threshold.

In implementations, each active object of the multiple active objects detected by the visual tracking system 102 may be represented by a corresponding potential object candidate obtained at block 306, and may be further enclosed by a predefined shape (such as a rectangle, for example) of a predetermined size at block 306. In implementations, if a measure of separation between two active objects is represented by a distance (or a number of pixels) between origins of predefined shapes (such as a rectangle, for example) that separately enclose corresponding potential object candidates of these two active objects, the visual tracking system 102 may determine or generate a single or combined piece of indication information of the two active objects cooperatively based on multiple matched position candidates if the measure of separation for these two active objects is less than a predetermined distance threshold (i.e., the predetermined separation threshold), such as 10 pixels, etc. Alternatively, the visual tracking system 102 may determine or generate a single or combined piece of indication information of the two active objects cooperatively (for example, as a whole) based on multiple matched position candidates if a ratio between the measure of separation for these two active objects and a dimension (e.g., a height or width) of the video frame including the two active objects is less than a predetermined ratio threshold (i.e., the predetermined separation threshold), such as 0.1, etc. Otherwise, the visual tracking system 102 may determine or generate respective indication information of multiple matched position candidates for the two active objects separately.

In implementations, a measure of separation between two active objects is represented by a degree (e.g., percentage, etc.) of area overlap between predefined shapes (such as a rectangle, for example) that separately enclose corresponding potential object candidates of the two active objects, the visual tracking system 102 may determine or generate a single or combined piece of indication information of the two active objects cooperatively based on multiple matched position candidates if the measure of separation for these two active objects is less than a predetermined overlap threshold (i.e., the predetermined separation threshold), such as 50%, etc. Otherwise, the visual tracking system 102 may determine or generate respective pieces of indication information of the two active objects based on multiple matched position candidates separately.

In implementations, when determining or generating a single or combined piece of indication information of two active objects cooperatively based on multiple matched position candidates, the visual tracking system 102 may generate a new predefined shape having a size that substantially encloses the predefined shapes of the potential object candidates of the two active objects, and set a newly matched position candidate for this new predefined shape as a mean or average of the original matched position candidates of the two active objects (i.e., the origins of the predefined shapes of the potential object candidates of the two active objects). The visual tracking system 102 may then use this new predefined shape and the newly matched position candidate as a single or combined piece of indication information to represent a "combined" active object (which includes the two active objects), and may then send the single or combined piece of indication information to the display device 112 to enable or cause the display device 112 to provide respective indications of the active objects in a subsequent presentation (e.g., a next video frame of a live video stream or a recorded video that is presented or played by the display device 112, etc.). In implementations, the visual tracking system 102 may perform the operation as described above at block 310 by pretending or treating such "combined" active object as a single active object according to one of the different display modes, such as a zoom-in image mode, a PIP/FIF image mode, or a shape indication mode.

Figure 6A:
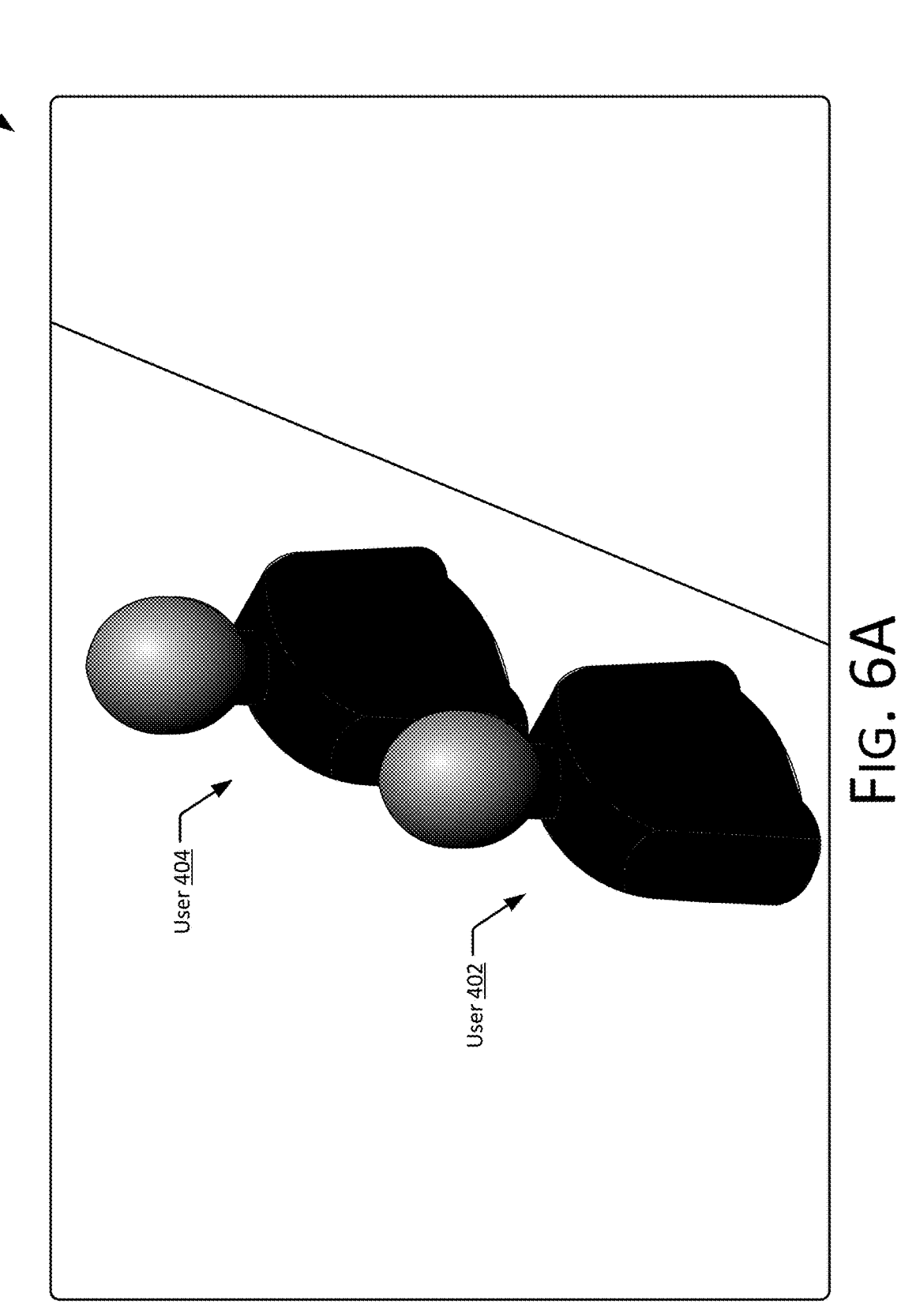
FIGS. 6A-6C illustrate example display results obtained for two active speakers of FIG. 4 according to different display modes.
Figure 6B:
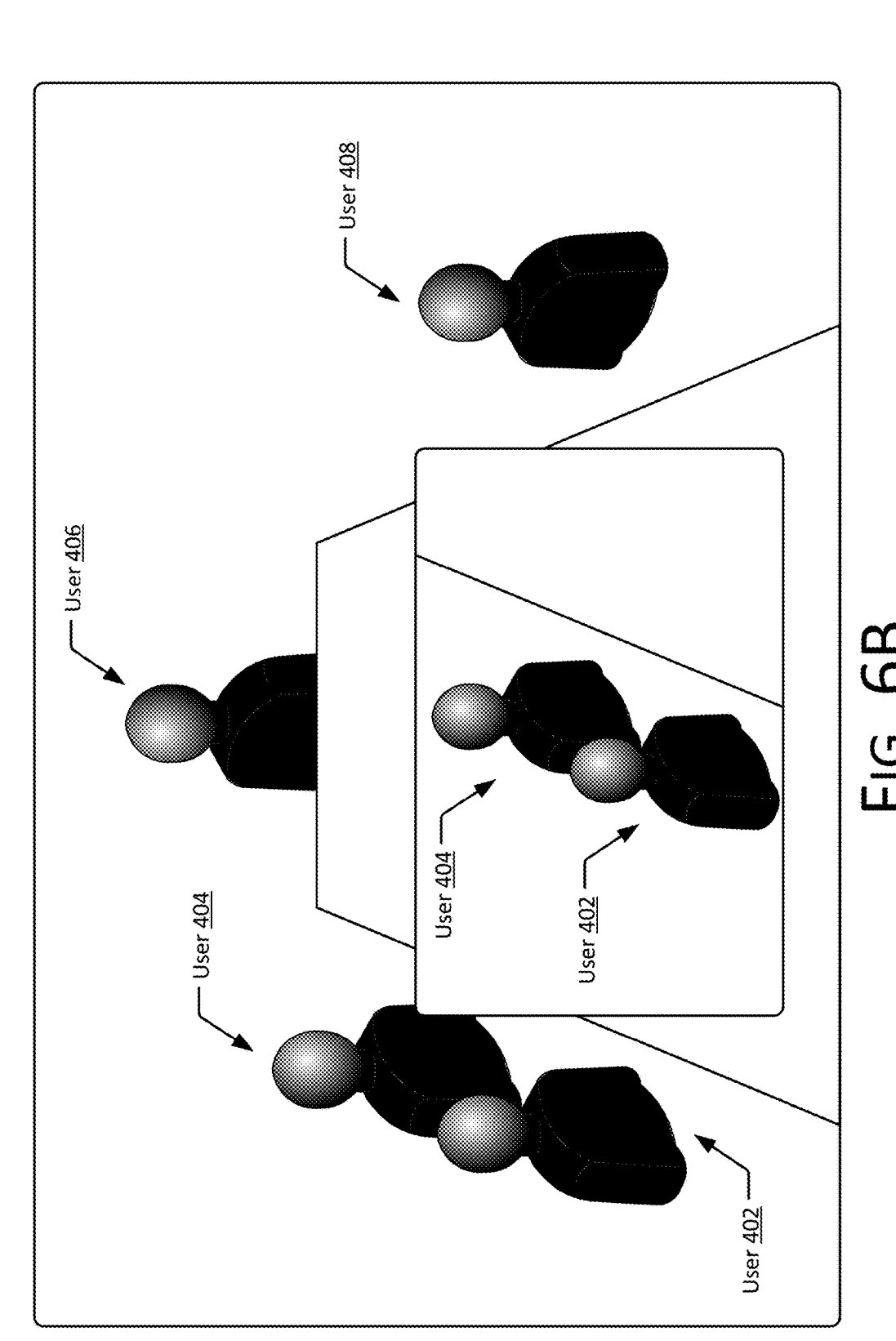
Figure 6C:
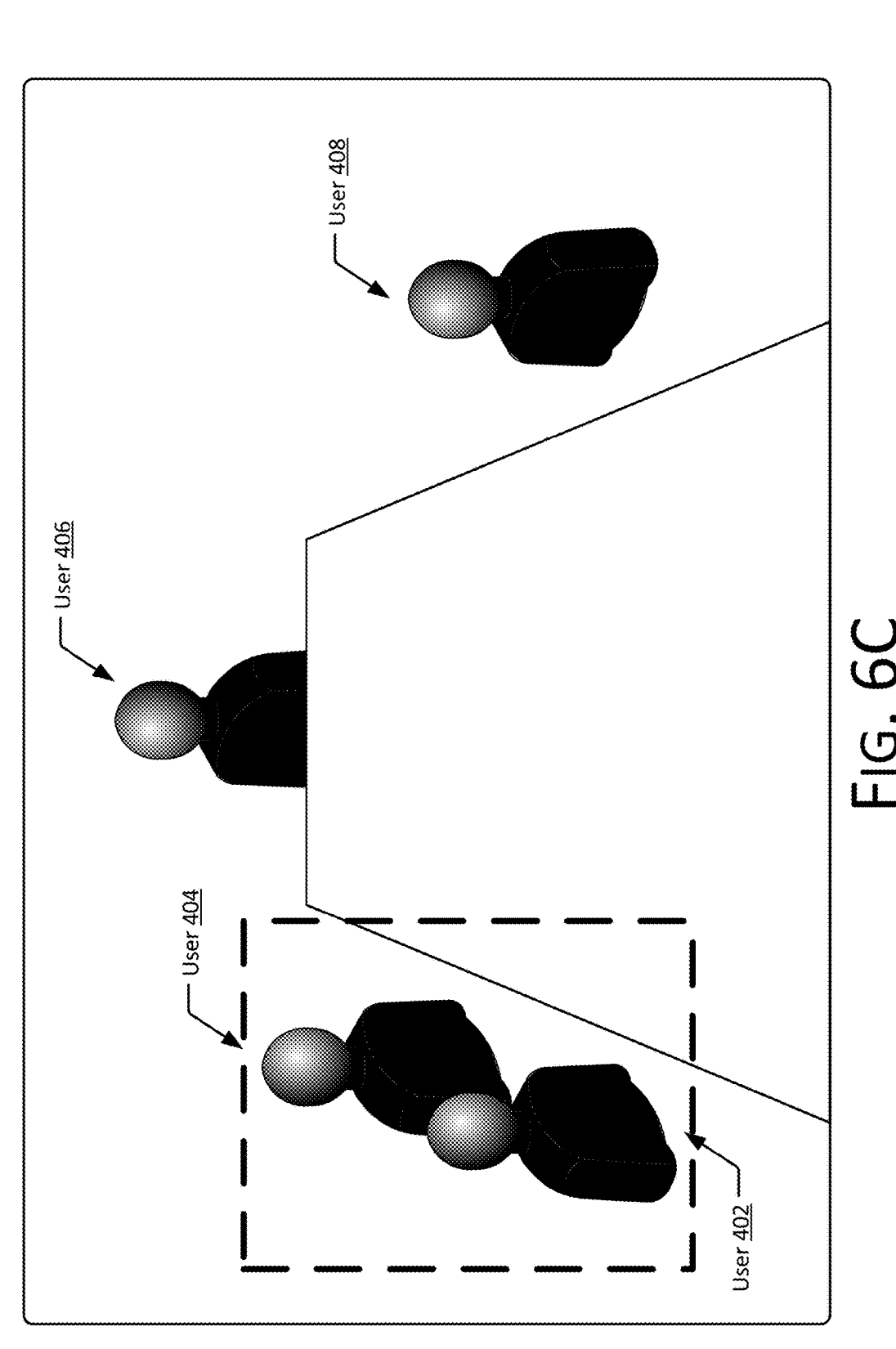
Figure 7A:
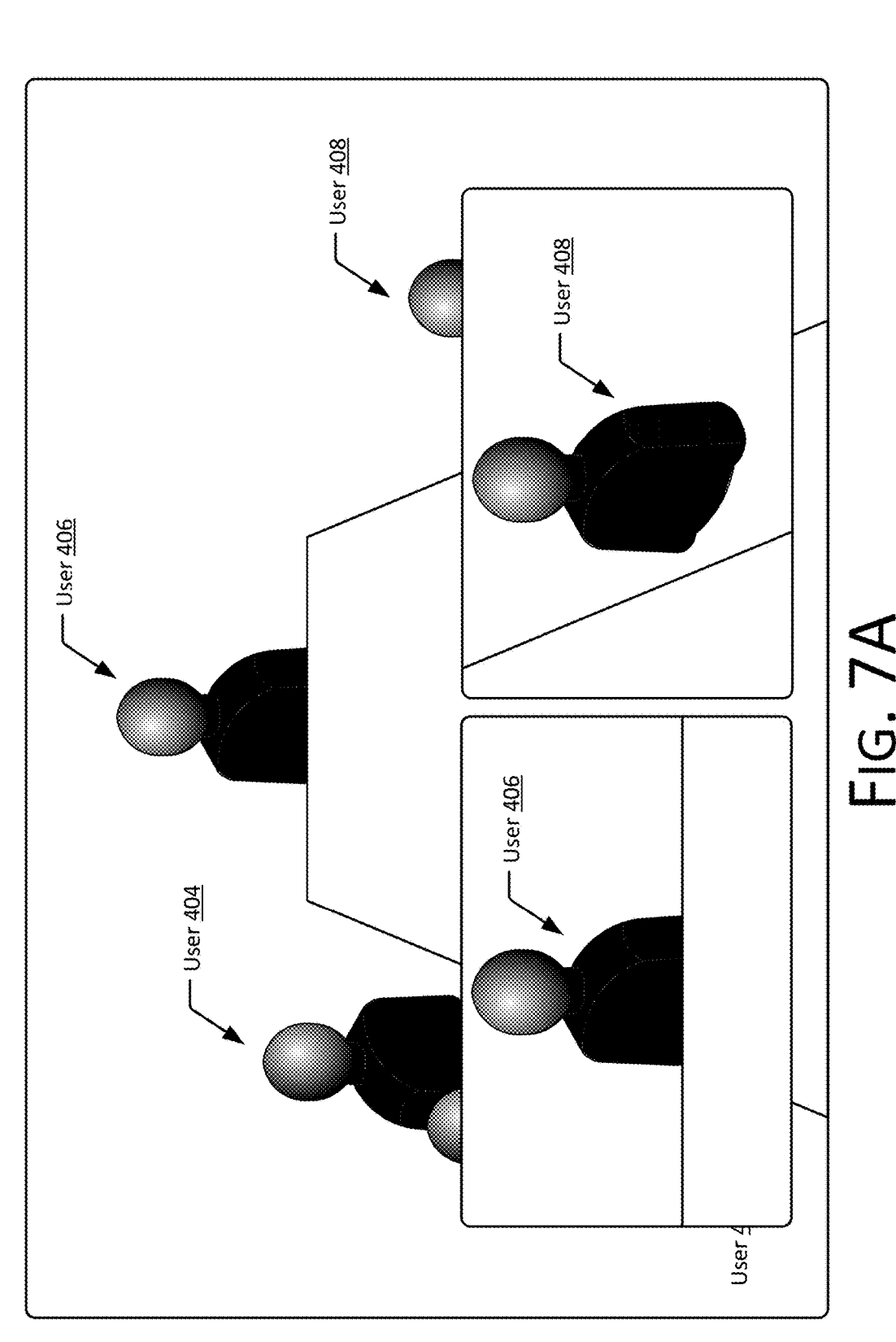
FIGS. 7A and 7B illustrate example display results obtained for two active speakers of FIG. 4 according to different display modes.
Figure 7B:
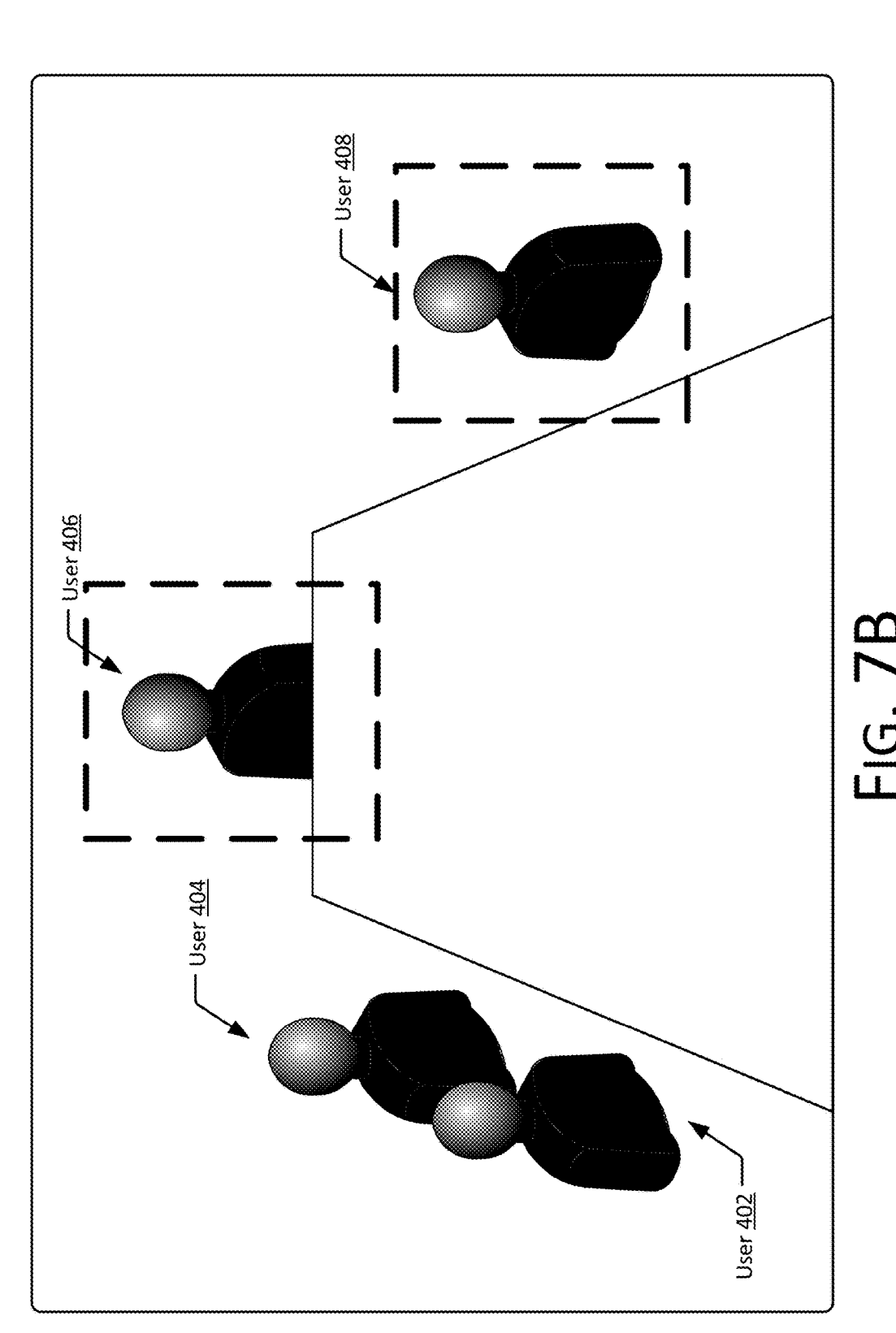

In implementations, when determining or generating respective pieces of indication information of two active objects based on multiple matched position candidates separately, the visual tracking system 102 may separately generate a respective piece of indication information of each active object based on a corresponding matched position candidate. In implementations, the visual tracking system 102 may then combine the respective pieces of indication information of the active objects to form a single or combined piece of indication information, and send the single or combined piece of indication information to the display device 112 to enable or cause the display device 112 to provide respective indications of the active objects in a subsequent presentation (e.g., a next video frame of a live video stream or a recorded video that is presented or played by the display device 112, etc.). In this case, a zoom-in image mode may not be available, and the visual tracking system 102 may employ a PIP/FIF image mode or a shape indication mode to enable or cause the display device 112 to provide the respective indications of the active objects in the subsequent presentation. FIGS. 6A-6C illustrate example display results obtained for two active speakers with a measure of separation therebetween less than a predetermined separation threshold (such as the users 402 and 404 of FIG. 4) according to a zoom-in image mode, a PIP/FIF image mode, and a shape indication mode respectively. FIGS. 7A and 7B illustrate example display results obtained for two active speakers with a measure of separation therebetween greater than or equal to a predetermined separation threshold (such as the users 406 and 408 of FIG. 4) according to a PIP/FIF image mode and a shape indication mode respectively. As can be seen in FIG. 7A, respective PIP images for the two active speakers (i.e., the user 402 and the user 408) are placed at different positions a video frame of a live video or recorded video.

Any of the acts of any of the methods described herein may be implemented at least partially by a processor or other electronic device based on instructions that are stored on one or more computer-readable media. By way of example and not limitation, any of the acts of any of the methods described herein may be implemented under control of one or more processors configured with executable instructions that may be stored on one or more computer-readable media.

<div align="center">CONCLUSION</div>

Although implementations have been described in language specific to structural features and/or methodological acts, it is to be understood that the claims are not necessarily limited to the specific features or acts described. Rather, the specific features and acts are disclosed as exemplary forms of implementing the claimed subject matter. Additionally or alternatively, some or all of the operations may be implemented by one or more ASICS, FPGAs, or other hardware.

The present disclosure can be further understood using the following clauses.

Clause 1: A method implemented by one or more processors, the method comprising: determining one or more first position candidates for an object based on audio data; determining one or more second position candidates for the object based on image data; matching the one or more first position candidates with the one or more second position candidates to obtain a matched position candidate for the object; and generating indication information of the object based at least in part on the matched position candidate, and sending the indication information to a display device to enable the display device to provide an indication of the object in a subsequent presentation.

Clause 2: The method of Clause 1, further comprising: receiving the audio data through a plurality of audio sensors; and receiving the image data through one or more image sensors.

Clause 3: The method of Clause 1, further comprising: separately extracting the audio data and the image data from a recorded video.

Clause 4: The method of Clause 1, wherein matching the one or more first position candidates with the one or more second position candidates to obtain the matched position candidate for the object comprises determining whether a first position candidate of the one or more first position candidates is separated from a second position candidate of the one or more second position candidates within a predetermined range of separation.

Clause 5: The method of Clause 1, wherein enabling the display device to provide the indication of the object in the subsequent presentation comprises enabling the display device to draw a predefined shape to enclose at least a portion of the object in the subsequent presentation, or display a separate or zoom-in image of the object in the subsequent presentation.

Clause 6: The method of Clause 1, further comprising tracking the object based on new audio data and new video data.

Clause 7: The method of Clause 1, further comprising: sending information of adjusting the indication to the display device to enable the display device to adjust the indication of the object in the subsequent presentation.

Clause 8: The method of Clause 1, wherein determining the one or more first position candidates for the object based on the audio data comprises: performing sound localization on the audio data to obtain the one or more first position candidates for the object.

Clause 9: The method of Clause 1, wherein determining the one or more second position candidates for the object based on the image data comprises: performing face recognition on one or more images included in the image data to obtain the one or more second position candidates for the object.

Clause 10: The method of Clause 1, wherein: prior to sending the indication information to the display device, the method further comprises: obtaining a confidence value of the matched position candidate; and determining that the confidence value is greater than or equal to a predetermined threshold.

Clause 11: One or more processor readable media storing executable instructions that, when executed by one or more processors, cause the one or more processors to perform acts comprising: determining one or more first position candidates for an object based on audio data; determining one or more second position candidates for the object based on image data; matching the one or more first position candidates with the one or more second position candidates to obtain a matched position candidate for the object; and generating indication information of the object based at least in part on the matched position candidate, and sending the indication information to a display device to enable the display device to provide an indication of the object in a subsequent presentation.

Clause 12: The one or more processor readable media of Clause 11, the acts further comprising: receiving the audio data through a plurality of audio sensors, and receiving the image data through one or more image sensors.

Clause 13: The one or more processor readable media of Clause 11, wherein matching the one or more first position candidates with the one or more second position candidates to obtain the matched position candidate for the object comprises determining whether a first position candidate of the one or more first position candidates is separated from a second position candidate of the one or more second position candidates within a predetermined range of separation.

Clause 14: The one or more processor readable media of Clause 11, wherein enabling the display device to provide the indication of the object in the subsequent presentation comprises enabling the display device to draw a predefined shape to enclose at least a portion of the object in the subsequent presentation, or display a separate or zoom-in image of the object in the subsequent presentation.

Clause 15: The one or more processor readable media of Clause 11, the acts further comprising tracking the object based on new audio data and new video data.

Clause 16: The one or more processor readable media of Clause 11, the acts further comprising: sending information of adjusting the indication to the display device to enable the display device to adjust the indication of the object in the subsequent presentation.

Clause 17: The one or more processor readable media of Clause 11, wherein determining the one or more first position candidates for the object based on the audio data comprises: performing sound localization on the audio data to obtain the one or more first position candidates for the object.

Clause 18: The one or more processor readable media of Clause 11, wherein determining the one or more second position candidates for the object based on the image data comprises: performing face recognition on one or more images included in the image data to obtain the one or more second position candidates for the object.

Clause 19: The one or more processor readable media of Clause 11, wherein: prior to sending the indication information to the display device, the acts further comprise: obtaining a confidence value of the matched position candidate; and determining that the confidence value is greater than or equal to a predetermined threshold.

Clause 20: A system comprising: one or more processors; and memory storing executable instructions that, when executed by one or more processors, cause the one or more processors to perform acts comprising: determining one or more first position candidates for an object based on audio data; determining one or more second position candidates for the object based on image data; matching the one or more first position candidates with the one or more second position candidates to obtain a matched position candidate for the object; and generating indication information of the object based at least in part on the matched position candidate, and sending the indication information to a display device to enable the display device to provide an indication of the object in a subsequent presentation.

What is claimed is:

1. A method implemented by one or more processors, the method comprising:

determining one or more first position candidates for an object based on audio data, the one or more first position candidates corresponding to one or more active sound sources that actively make a sound for a consecutive period of time greater than or equal to a predefined time threshold, the predefined time threshold being used to differentiate the one or more active sound sources from a sound source that makes a spontaneous or short sound and a sound source that does not actively make sound;

determining one or more second position candidates for the object based on image data;

matching the one or more first position candidates with the one or more second position candidates to obtain a matched position candidate for the object; and generating indication information of the object based at least in part on the matched position candidate, and sending the indication information to a display device to enable the display device to provide an indication of the object in a subsequent presentation.

2. The method of claim 1, further comprising:

receiving the audio data through a plurality of audio sensors; and receiving the image data through one or more image sensors.

3. The method of claim 1, further comprising: separately extracting the audio data and the image data from a recorded video.

4. The method of claim 1, wherein matching the one or more first position candidates with the one or more second position candidates to obtain the matched position candidate for the object comprises determining whether a first position candidate of the one or more first position candidates is separated from a second position candidate of the one or more second position candidates within a predetermined range of separation.

5. The method of claim 1, wherein enabling the display device to provide the indication of the object in the subsequent presentation comprises enabling the display device to draw a predefined shape to enclose at least a portion of the object in the subsequent presentation, or display a separate or zoom-in image of the object in the subsequent presentation.

6. The method of claim 1, further comprising tracking the object based on new audio data and new video data.

7. The method of claim 1, further comprising: sending information of adjusting the indication to the display device to enable the display device to adjust the indication of the object in the subsequent presentation.

8. The method of claim 1, wherein determining the one or more first position candidates for the object based on the audio data comprises: performing sound localization on the audio data to obtain the one or more first position candidates for the object.

9. The method of claim 1, wherein determining the one or more second position candidates for the object based on the image data comprises: performing face recognition on one or more images included in the image data to obtain the one or more second position candidates for the object.

10. The method of claim 1, wherein: prior to sending the indication information to the display device, the method further comprises:

obtaining a confidence value of the matched position candidate; and determining that the confidence value is greater than or equal to a predetermined threshold.

11. One or more non-transitory processor readable media storing executable instructions that, when executed by one or more processors, cause the one or more processors to perform acts comprising:

determining one or more first position candidates for an object based on audio data, the one or more first position candidates corresponding to one or more active sound sources that actively make a sound for a consecutive period of time greater than or equal to a predefined time threshold, the predefined time threshold being used to differentiate the one or more active sound sources from a sound source that makes a spontaneous or short sound and a sound source that does not actively make sound;

determining one or more second position candidates for the object based on image data;

matching the one or more first position candidates with the one or more second position candidates to obtain a matched position candidate for the object; and generating indication information of the object based at least in part on the matched position candidate, and sending the indication information to a display device to enable the display device to provide an indication of the object in a subsequent presentation.

12. The one or more non-transitory processor readable media of claim 11, the acts further comprising:

receiving the audio data through a plurality of audio sensors, and receiving the image data through one or more image sensors.

13. The one or more non-transitory processor readable media of claim 11, wherein matching the one or more first position candidates with the one or more second position candidates to obtain the matched position candidate for the object comprises determining whether a first position candidate of the one or more first position candidates is separated from a second position candidate of the one or more second position candidates within a predetermined range of separation.

14. The one or more non-transitory processor readable media of claim 11, wherein enabling the display device to provide the indication of the object in the subsequent presentation comprises enabling the display device to draw a predefined shape to enclose at least a portion of the object in the subsequent presentation, or display a separate or zoom-in image of the object in the subsequent presentation.

15. The one or more non-transitory processor readable media of claim 11, the acts further comprising tracking the object based on new audio data and new video data.

16. The one or more non-transitory processor readable media of claim 11, the acts further comprising: sending information of adjusting the indication to the display device to enable the display device to adjust the indication of the object in the subsequent presentation.

17. The one or more non-transitory processor readable media of claim 11, wherein determining the one or more first position candidates for the object based on the audio data comprises: performing sound localization on the audio data to obtain the one or more first position candidates for the object.

18. The one or more non-transitory processor readable media of claim 11, wherein determining the one or more second position candidates for the object based on the image data comprises: performing face recognition on one or more images included in the image data to obtain the one or more second position candidates for the object.

19. The one or more non-transitory processor readable media of claim 11, wherein: prior to sending the indication information to the display device, the acts further comprise:

obtaining a confidence value of the matched position candidate; and determining that the confidence value is greater than or equal to a predetermined threshold.

20. A system comprising:

one or more processors; and memory storing executable instructions that, when executed by one or more processors, cause the one or more processors to perform acts comprising:

determining one or more first position candidates for an object based on audio data, the one or more first position candidates corresponding to one or more active sound sources that actively make a sound for a consecutive period of time greater than or equal to a predefined time threshold, the predefined time threshold being used to differentiate the one or more active sound sources from a sound source that makes a spontaneous or short sound and a sound source that does not actively make sound;

determining one or more second position candidates for the object based on image data;

matching the one or more first position candidates with the one or more second position candidates to obtain a matched position candidate for the object; and generating indication information of the object based at least in part on the matched position candidate, and sending the indication information to a display device to enable the display device to provide an indication of the object in a subsequent presentation.

* * * * *